Oct. 26, 1965 R. E. McILVANEY ETAL 3,213,789
METHOD OF MAKING RUBBER PRINTING PLATES
Filed Oct. 30, 1963 2 Sheets-Sheet 1
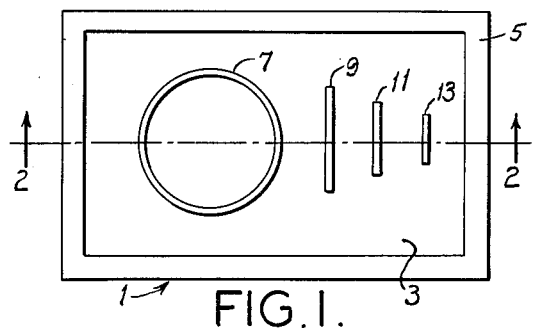
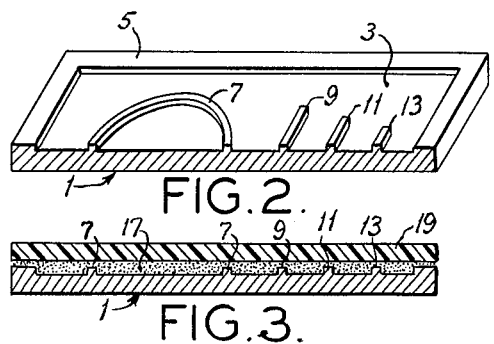
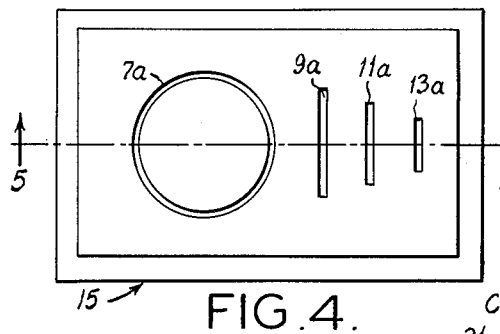
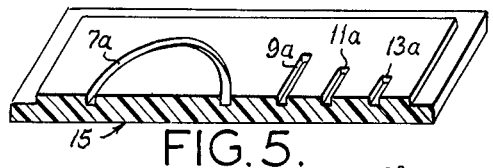
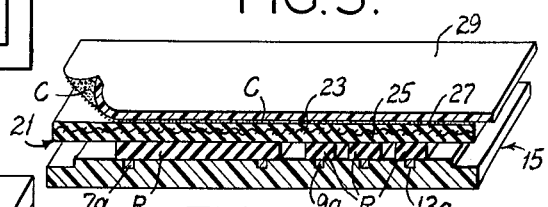
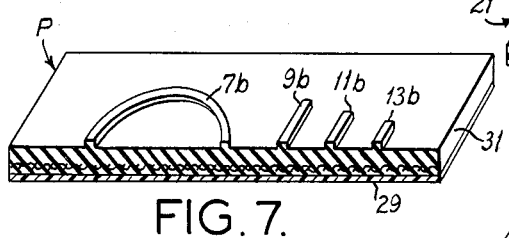
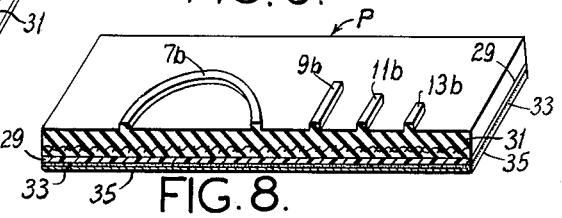
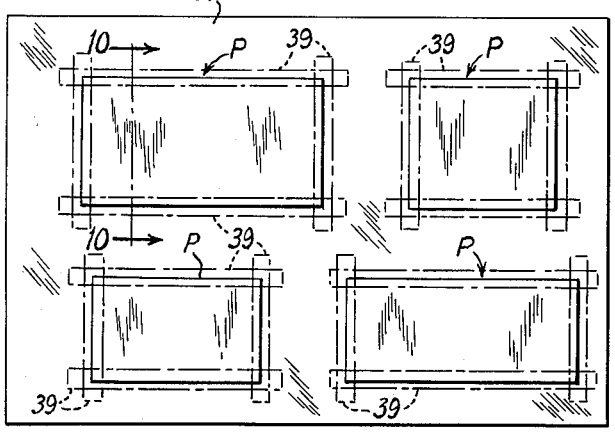
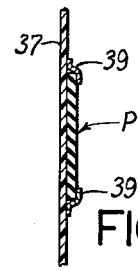
Ralph E. McIlvaney,
John S. Baybo,
Inventors.
Koenig, Pope, Senniger and Powers,
Attorneys.

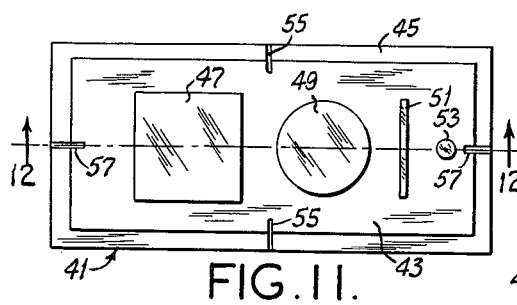
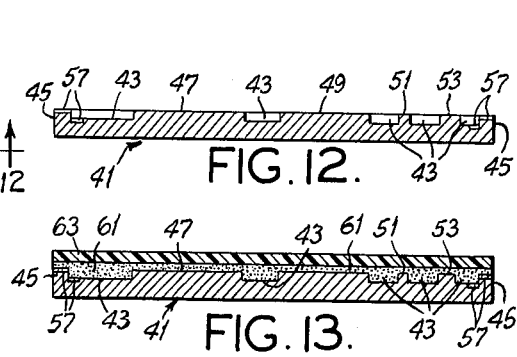
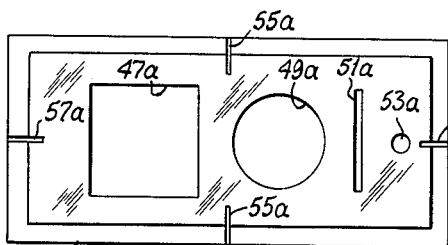
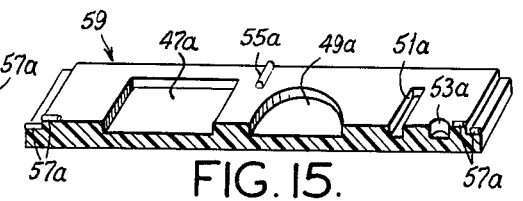
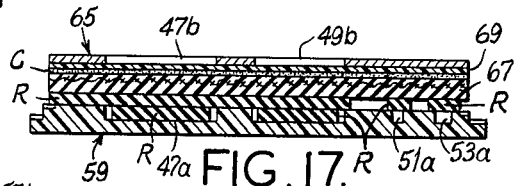
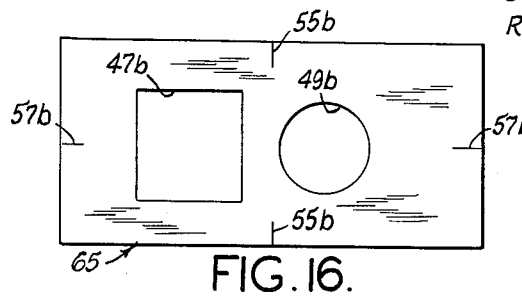
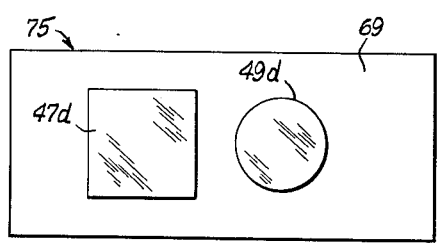
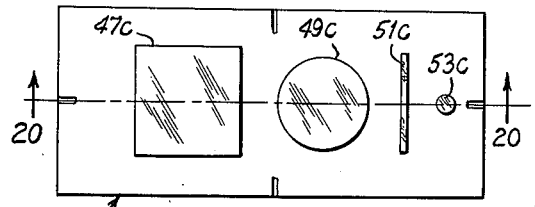
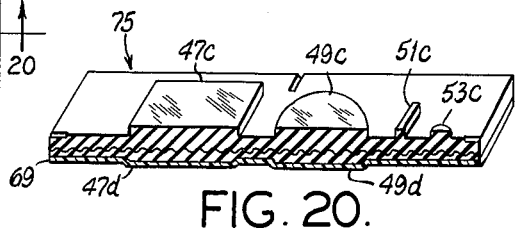

United States Patent Office 3,213,789
Patented Oct. 26, 1965

3,213,789
METHOD OF MAKING RUBBER
PRINTING PLATES
Ralph E. McIlvaney, St. Louis County, and John S. Baybo, St. Louis, Mo., assignors to Braco Engineering Company, St. Louis, Mo., a corporation of Missouri
Filed Oct. 30, 1963, Ser. No. 320,009
4 Claims. (Cl. 101—401.3)

This invention relates to printing plates, and more particularly to methods of making dimensionally stabilized rubber printing plates.

It is desirable that rubber printing plates (i.e., rubber plates having on one face thereof a pattern in relief of the matter which is to be printed by means of the plate) be attached to a dimensionally stable backing sheet so as to prevent distortion of the plate and thereby prevent distortion of the print produced by the plate. It has been attempted to accomplish this by cementing the rubber plate to a dimensionally stable backing sheet, such as a sheet of polyethylene terephthalate resin sold under the trade name Mylar by E. I. du Pont de Nemours & Co. This, however, is not completely satisfactory as it is difficult to attain a sufficient bond of the rubber plate to the backing as to insure against the rubber plate peeling off the backing. Moreover, this involves a separate operation subsequent to the operations involved in forming the rubber plate.

Among the several objects of this invention may be noted the provision of a method of making a dimensionally stabilized rubber printing plate (i.e., a rubber printing plate on a dimensionally stable backing) with such a bond between the plate and the backing as to minimize any tendency for the plate to peel off the backing; the provision of such a method in which the rubber printing plate is formed and applied to the backing in one operation; the provision of such a method of making such a dimensionally stabilized rubber printing plate which further involves making the plate ready, i.e., forming the plate so as to provide for pressure differentiation between various printing areas on the plate requiring different printing pressures; and the provision of methods such as described which involve economy as to time and materials. Other objects and features will be in part apparent and in part pointed out hereinafter.

The invention accordingly comprises the methods hereinafter described, the scope of the invention being indicated in the following claims.

In the accompanying drawings, in which several of various possible embodiments of the invention are illustrated, FIG. 1 is a plan of a so-called master metal engraving;

FIG. 2 is a perspective in half section on line 2—2 of FIG. 1;

FIG. 3 is a section showing how a so-called matrix is made using the master engraving;

FIG. 4 is a plan of the matrix;

FIG. 5 is a perspective in half section on line 5—5 of FIG. 4;

FIG. 6 is a view like FIG. 5 showing the formation of a dimensionally stabilized rubber printing plate in accordance with this invention, using the matrix of FIGS. 4 and 5;

FIG. 7 is a perspective in half section of a completed printing plate;

FIG. 8 is a perspective in half section showing the FIG. 7 plate with so-called "sticky-back" on its back face;

FIG. 9 is a view illustrating a number of plates made in accordance with this invention applied by means of the "sticky-back" to a large carrier sheet for application to the plate cylinder of a printing press;

FIG. 10 is a section taken on line 10—10 of FIG. 9;

FIG. 11 is a plan of another master metal engraving to illustrate the method of this invention for making made-ready dimensionally stable rubber printing plates;

FIG. 12 is a section on line 12—12 of FIG. 11;

FIG. 13 is a view similar to FIG. 12 showing how a matrix is made using the FIG. 11 master engraving;

FIG. 14 is a plan of the matrix made according to FIG. 13;

FIG. 15 is a perspective in half section of the FIG. 14 matrix;

FIG. 16 is a view of a stencil sheet or template used in the method of this invention for making a made-ready dimensionally stable rubber printing plate;

FIG. 17 is a section showing certain steps in the method, utilizing the matrix of FIGS. 14 and 15 and the stencil sheet or template of FIG. 16;

FIG. 18 is a view of the printing face of the completed made-ready plate;

FIG. 19 is a view of other face or back face of the completed made-ready plate; and FIG. 20 is a perspective in half section of the plate shown in FIGS. 18 and 19.

Corresponding reference characters indicate corresponding parts throughout the several views of the drawings.

Referring first to FIGS. 1 and 2 of the drawings, there is indicated at 1 what is referred to as a master engraving. As shown, this consists of a rectangular metal plate, for example, which has one face routed out as indicated at 3 to provide a desired printing pattern in relief, and a peripheral retaining wall 5 all around the plate. For purposes of simplified illustration, the printing pattern is shown as comprising a ring 7 and three bars 9, 11, 13. The master engraving is made in well-known conventional manner. It is used to make a matrix 15.

As shown in FIG. 3, the matrix 15 is made using master engraving 1 in conventional maner by packing a thermosetting resin powder as indicated at 17 into the routed cavity 3 in the master engraving, and covering the faces of peripheral wall 5 and printing pattern 7, 9, 11, 13 with this powder to a predetermined depth. The powder may be a phenol-formaldehyde resin powder such as sold under the trade designation "Bakelite" conventionally used for making such matrices. A plate 19 of thermosetting resin is applied over the powder. This plate may be a plate of phenol-formaldehyde resin such as sold under the trade designation "Bakelite" conventionally used for making such matrices. It will be understood that a parting compound will usually be applied to the master engraving to enable the matrix to be stripped from the engraving. Heat and pressure are applied to set and cure the resin powder and bond it to plate 19, thereby to form matrix 15 having impressions in reverse of relief of the printing pattern 7, 9, 11, 13. The impressions or cavities in the matrix 15 are respectively designated 7a, 9a, 11a and 13a. FIGS. 4 and 5 show the matrix 15 stripped from the master engraving 1.

As shown in FIG. 6, strips of unvulcanized rubber R are placed over the cavities 7a, 9a, 11a and 13a in the matrix 15. A rubber sheet 21 is applied over these strips. This sheet 21, as appears in FIG. 6, may consist of a piece of fabric 23 having layers 25 and 27 of unvulcanized rubber on both faces thereof. Layer 25 is shown as thicker than layer 27, and layer 25 is applied face down over rubber R on the matrix. A suitable parting material is applied to the matrix prior to the application of rubber R and sheet 21. The rubber used at R and in sheet 21 may have a durometer in the range from 20–80 for example.

At 29 in FIG. 6 is indicated a backing sheet of dimensionally stable plastic material, use of a sheet of Mylar being presently preferred. This is preliminarily prepared with a coating C on one face of an adhesive adapted to be activated by heat and pressure, such as, for example, a thermoplastic adhesive having a solids content of pigment-reinforced synthetic rubber and synthetic resin with methyl ethyl ketone as a solvent, such as that sold under the trade name Pliobond 20 by the Chemical Division of The Goodyear Tire & Rubber Company of Akron, Ohio. This particular adhesive contains 20% solids and 80% methyl ethyl ketone. The adhesive is coated on the Mylar sheet (it may be simply brushed on) and allowed to dry.

The adhesive-coated Mylar sheet 29 is placed over the rubber sheet 21 with the adhesive-coated side of the Mylar sheet contacting the rubber sheet. Then, the assembly of the matrix 15, rubber R, rubber sheet 21 and the adhesive-coated Mylar sheet is placed in a vulcanizing press, and heat and pressure applied. This causes filling of the cavities 7a, 9a, 11a and 13a in the matrix 15 with rubber from strips R, bonding of the rubber in the cavities with rubber sheet 21, activation of adhesive C for bonding of sheet 21 to backing sheet 29, and vulcanization of the rubber, and results in the formation of the composite plate shown in FIG. 7 and designated in its entirety by reference character P. As appears in FIG. 7, composite plate P comprises rubber layer 31 backed by Mylar layer 29, with a printing pattern in relief on the face of the rubber layer comprising ring 7b and bars 9b, 11b and 13b. The rubber layer 31 is strongly bonded to the dimensionally stable Mylar backing layer 29 and is practically impossible to peel off, unlike the case where a preformed rubber plate is simply adhered to a Mylar backing sheet.

FIG. 8 shows the plate P with an application of so-called "sticky-back" on the backing layer 29. "Sticky-back" is a sheet 33 of pressure-sensitive adhesive material (adhesive on both faces) covered with a protective sheet 35. The "sticky-back" is used for adhering plates P in properly registered position on a dimensionally stable carrier sheet 37 (see FIGS. 9 and 10) which may be a Mylar sheet, the protective sheet 35 being peeled off for this purpose. Masking tape may be applied over the edges of plates P as indicated at 39 in FIGS. 9 and 10, if desired, to inhibit infiltration of solvents used in cleaning the carrier sheet and plates between the plates and the carrier sheet. The carrier sheet with the plates P thereon is applied to the plate cylinder of a printing press.

The principles of the invention as above described are also applicable to making dimensionally stabilized rubber printing plates which are formed to provide for pressure differentiation between various printing areas on the plate requiring different printing pressures (i.e., "made-ready" plates). In this regard, it will be understood that when a printing pattern includes both relatively large printing areas and relatively small printing areas (such as fine lines or dots, for example) it is usually necessary in order to obtain a proper impression in the printing operation that provision be made for applying less pressure on the small areas than on the large areas. Referring to FIGS. 11 and 12 of the drawings, there is indicated at 41 a master engraving consisting of a rectangular metal plate, for example, which has one face routed out as indicated at 43 to provide a desired printing pattern in relief, and a peripheral retaining wall 45 all around the plate, the printing pattern being shown as comprising two relatively large printing areas, a square area 47 and a circular area 49, and two relatively small printing areas, a fine-line area 51 and a dot 53. This is illustrative of conventional printing patterns which will include designs, trademarks, etc., requiring make ready. The routing at 43 may be uniform in depth throughout, corresponding to the thickness in relief desired for the printing areas on the printing face of the rubber printing plate to be made. The master engraving 41 is also shown as formed with grooves as indicated at 55 and 57 for forming centering lines 55a and 57a (see FIGS. 14 and 15) in a matrix 59 (see FIGS. 14 and 15) to be made using the master engraving.

As shown in FIG. 13, the matrix is made using master engraving 41 in the same manner as above described by packing a thermosetting resin powder as indicated at 61 into the routed cavity 43 in the master engraving, and covering the faces of peripheral wall 45 and of areas 47, 49, 51 and 53 with this powder to a predetermined depth. A plate 63 of thermosetting resin is applied over the powder, and a parting compound may be applied to the master engraving to enable the matrix to be stripped from the engraving. Heat and pressure are applied to set and cure the resin powder and bond it to plate 63, thereby to form a matrix 59 having impressions in reverse of relief of the printing areas 47, 49, 51 and 53 of the master engraving. Referring to FIGS. 14 and 15, the impressions or cavities in the matrix 59 are respectively designated 47a, 49a, 51a and 53a. These are all of substantially the same depth. By reason of the provision of grooves 55 and 57 in the master engraving, centering lines 55a and 57a are formed as ridges on the matrix 59. FIGS. 14 and 15 show the matrix 59 stripped from the master engraving 41.

As shown in FIG. 16, a so-called stencil sheet or template 65 is prepared having openings 47b and 49b corresponding in outline to the large areas 47 and 49 of the master engraving 41 and to the large areas 47a and 49a of the matrix 59, but without any openings corresponding to small areas 51 and 53. This sheet or template may be made of paper, sheet metal, or any other suitable material, and may be easily and accurately prepared simply by taking an ink impression (a proof) on the stencil sheet or template off the master engraving 41, then cutting out the areas printed on the sheet or template by contact with ink on areas 47 and 49 of the master engraving. Centering lines 55b and 57b are marked on the stencil sheet or template, being accurately located thereon relative to openings 47b and 49b from grooves 55 and 57 of the master engraving.

As shown in FIG. 17, strips of unvulcanized rubber R are placed in the cavities 47a and 49a of the matrix 59, and over these cavities and other portions of the matrix 59. Strips of unvulcanized rubber may also be placed over cavities 51a and 53a. A rubber sheet 67 is applied over rubber R on the matrix. This sheet 67 corresponds to sheet 21 shown in FIG. 6. Over the sheet 67 is placed a backing sheet 69 of dimensionally stable plastic material such as Mylar, corresponding to sheet 29 shown in FIG. 6, having a coating C the same as sheet 29. Stencil sheet or template 65 is applied over the sheet 69, and is centered by registering lines 55b and 57b on the stencil sheet or template with lines 55a and 57a on the matrix so that openings 47b and 49b in the stencil sheet or template register at least approximately (if not perfectly) with cavities 47a and 49b in the matrix 59. The stencil sheet or template is relatively thin.

Then, the assembly of the matrix 59, rubber R, rubber sheet 67, stencil sheet or template 65 and backing sheet 69 is placed in a vulcanizing press, and heat and pressure are applied to cause filling of the cavities 47a, 49a, 51a and 53a in the matrix with rubber (from strips R, possibly also some rubber from the rubber sheet 67), also to cause filling of the openings 47b and 49b of the stencil sheet or template 65 with rubber from layer 33 of the backing plate, bonding of the rubber in the cavities of the matrix with the backing plate, and vulcanization of the rubber. It will be understood from the pressure causes squeeze-out of plastic from sheet 69 and of rubber from sheet 67 into openings 47b and 49b of the stencil sheet or template, the plastic leveling off flush with the outer face of the template. This results in formation of the rubber printing plate 75 shown stripped from the matrix in FIGS. 18–20, and with stencil sheet or template 65 removed, having the printing pattern comprising printing areas 47c, 49c, 51c and 53c (corresponding to areas 47, 49, 51 and 53 of the master engraving 41) on its printing face (see FIGS. 18 and 20), and integral raised areas 47d and 49d of plastic sheet 69 infilled with rubber on its other face (see FIGS. 19 and 20). Areas 47d and 49d correspond in outline to and are at least approximately in register with areas 47c and 49c. The faces of areas 47d and 49d are offset from the back face of plate 75 by an amount equal to the thickness of the stencil sheet or template 65, and the amount of this offset may be made as desired by using a stencil sheet or template of appropriate thickness. When the plate 75 is used on the printing cylinder of a printing press, for example, raised areas 47d and 49d effect impression of ink on the work over areas 47c and 49c at higher pressure than over areas 51c and 53c (the latter not being backed by any raised areas). The differentiation in pressure may be accurately controlled in amount by suitable preselection of the thickness of the stencil sheet or template to determine the thickness of raised areas 47d and 49d and is accurately controlled as to location as will be evident.

It will be understood that a rubber printing plate may be made in accordance with the invention with raised areas of different thickness on the back of the plate by using a plurality of appropriate stencil sheets or templates of different thickness to provide the desired differentiation in thickness of the raised areas. In this manner, variable pressure may be obtained on different printing areas of the same plate for proper impression of all the printing areas.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of making a dimensionally stable made-ready rubber printing plate having on the printing face thereof a printing pattern in relief, said pattern having first and second printing areas as to which higher printing pressure is required for the first than for the second for proper printing impression, comprising applying unvulcanized rubber over a matrix having an impression of said pattern in reverse of relief with the areas thereof corresponding to both said printing areas of substantially the same depth, applying over said rubber a sheet of dimensionally stable plastic material having a coating of an adhesive on its face contacting the rubber which adhesive is adapted to be activated by heat and pressure, applying over the said sheet of plastic material a flat relatively thin template, said template being of such outline and so positioned relative to the matrix as to leave uncovered by the template an area at the back of said sheet of plastic material having a boundary such as to circumscribe the boundary of said first printing area while covering a portion of the back of said sheet of plastic material in register with said second printing area, applying heat and pressure to the assembly of the matrix, the rubber, the sheet of plastic material and the template to mold the rubber in the matrix to form the printing plate, to vulcanize the rubber, and to activate the adhesive to simultaneously effect bonding of the rubber to the sheet of plastic material, pressure being applied against the template to cause the rubber to fill the areas of reverse relief in the matrix thereby to form said printing pattern in relief in rubber at the printing face of the printing plate with substantially uniform projection of the entire printing pattern in relief from the plate at its printing face, and to cause the uncovered sheet plastic material to level off flush with the outer face of the template, thereby to form offset rubber-infilled areas of the sheet plastic material at the back of the plate with the area of the sheet plastic material lying beneath the template at the back of the plate inwardly offset from the area of the sheet plastic material levelled off flush with the outer face of the template at the back of the plate a distance corresponding to the thickness of the template, and stripping the template from the sheet plastic material at the back of the plate.

2. The method of claim 1 wherein the plastic sheet is a sheet of polyethylene terephthalate.

3. The method of claim 1 wherein the template is constituted by a sheet having an opening therein of such outline as to circumscribe said first printing area, and is applied over the sheet of plastic material with said opening substantially in register with said first printing area.

4. The method of claim 3 wherein the matrix and template are formed with corresponding centering lines and the template is positioned over the sheet of plastic material with said opening therein substantially in register with said first printing area by registering said lines.

References Cited by the Examiner
UNITED STATES PATENTS

| | | | |
|---|---|---|---|
| 2,048,631 | 7/36 | Motson | 101—395 |
| 2,099,154 | 11/37 | Waters | 101—379 |
| 3,103,168 | 9/63 | Braznell et al. | 101—401.1 |
| 3,119,330 | 1/64 | Kunetka | 101—379 X |

DAVID KLEIN, *Primary Examiner.*

WILLIAM B. PENN, *Examiner.*

UNITED STATES PATENT OFFICE
CERTIFICATE OF CORRECTION

Patent No. 3,213,789            October 26, 1965

Ralph E. McIlvaney et al.

It is hereby certified that error appears in the above numbered patent requiring correction and that the said Letters Patent should read as corrected below.

In the grant, lines 2 and 3, and line 13, and in the heading to the printed specification, lines 5 and 6, for "Braco Engineering Company", each occurrence, read -- Braco Engraving Company --.

Signed and sealed this 5th day of July 1966.

(SEAL)
Attest:

ERNEST W. SWIDER            EDWARD J. BRENNER
Attesting Officer            Commissioner of Patents